United States Patent
Nam

(10) Patent No.: US 10,641,158 B2
(45) Date of Patent: May 5, 2020

(54) COOLANT CONTROL SYSTEM AND CONTROL METHOD FOR THE SAME

(71) Applicants: HYUNDAI MOTOR COMPANY, Seoul (KR); KIA MOTORS CORPORATION, Seoul (KR)

(72) Inventor: Kihoon Nam, Gunpo-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/205,568

(22) Filed: Nov. 30, 2018

(65) Prior Publication Data
US 2020/0040804 A1   Feb. 6, 2020

(30) Foreign Application Priority Data
Aug. 3, 2018  (KR) .......... 10-2018-0090815

(51) Int. Cl.
*F01P 7/16* (2006.01)
*F01P 3/20* (2006.01)
(Continued)

(52) U.S. Cl.
CPC ............ *F01P 7/16* (2013.01); *F01P 3/02* (2013.01); *F01P 3/18* (2013.01); *F01P 3/20* (2013.01); *F01P 5/12* (2013.01); *F02B 29/0443* (2013.01); *F01P 2003/028* (2013.01); *F01P 2003/187* (2013.01); *F01P 2007/146* (2013.01); *F01P 2025/13* (2013.01); *F01P 2025/42* (2013.01); *F01P 2060/02* (2013.01)

(58) Field of Classification Search
CPC ........ F01P 7/16; F01P 3/18; F01P 3/02; F01P 5/12; F01P 3/20; F01P 2007/146; F01P 2003/028; F01P 2025/42; F01P 2025/13; F01P 2060/02; F01P 2003/187; F02B 29/0443
See application file for complete search history.

(56) References Cited

U.S. PATENT DOCUMENTS

2012/0137993 A1\*  6/2012  Kim .................. F01P 7/165
                                              123/41.11
2013/0221116 A1\*  8/2013  Tsuchiya ............ F01P 7/14
                                              236/34.5

FOREIGN PATENT DOCUMENTS

JP          2017008751 A  *  1/2017

\* cited by examiner

*Primary Examiner* — Jacob M Amick
*Assistant Examiner* — Charles Brauch
(74) *Attorney, Agent, or Firm* — Brinks Gilson & Lione

(57) ABSTRACT

A coolant control system includes: a high temperature radiator communicating with an engine through a high temperature coolant line, a high temperature coolant pump, a coolant temperature sensor, a low temperature radiator, a low temperature coolant pump, a water-cooled intercooler, an intake air temperature sensor, bypass valves provided upstream and downstream of the water-cooled intercooler for selectively controlling the high temperature coolant or the low temperature coolant to flow through the water-cooled intercooler, an ambient temperature sensor, a radiator bypass line connected to the high temperature coolant line and bypassing the high temperature radiator, a thermostat to selectively flow the high temperature coolant to the radiator bypass line, and a controller for controlling the operations of the low temperature coolant pump, the bypass valve and the thermostat in accordance with a vehicle operation state.

7 Claims, 6 Drawing Sheets

(51) Int. Cl.
*F02B 29/04* (2006.01)
*F01P 5/12* (2006.01)
*F01P 3/02* (2006.01)
*F01P 3/18* (2006.01)
*F01P 7/14* (2006.01)

COOLANT CONTROL SYSTEM AND CONTROL METHOD FOR THE SAME

CROSS-REFERENCE TO RELATED APPLICATION

This application claims priority to and the benefit of Korean Patent Application No. 10-2018-0090815, filed on Aug. 3, 0218, the entire contents of which are incorporated herein by reference.

FIELD

The present disclosure relates to a coolant control system and a control method for the same.

BACKGROUND

The statements in this section merely provide background information related to the present disclosure and may not constitute prior art.

In the case of enhanced exhaust regulations such as RDE (Real Driving Emission), which was applied in September 2017, vehicle test conditions became more extreme at outside temperatures of −7~35° C. Accordingly, researches on exhaust gas and fuel consumption in low temperature of intake air/high temperature of intake air, which are flowed into an engine combustion chamber, are being conducted.

When the intake air temperature is very low, the NOx emission is increased due to the limitation of the exhaust gas recirculation (EGR) supply, and when the intake air temperature is high, the NOx emission amount is increased due to the increase of the combustion temperature.

Thus, there is a need for improvements in the cooling system that cools the engine and the various systems to accommodate enhanced exhaust emissions regulations.

The above information disclosed in this Background section is only for enhancement of understanding of the background of the present disclosure and therefore it may contain information that does not form the prior art that is already known in this country to a person of ordinary skill in the art.

SUMMARY

The present disclosure provides a coolant control system provided with a high temperature radiator and a low temperature radiator and a control method for the same having advantages of improving cooling efficiency in various external environments A coolant control system according to an exemplary form of the present disclosure may include: a high temperature radiator communicating with an engine through a high temperature coolant line, a high temperature coolant pump provided on the high temperature coolant line, a coolant temperature sensor detecting a temperature of a high temperature coolant flowing through the engine and the high temperature radiator and outputting a corresponding signal, a low temperature radiator communicating with an exhaust gas recirculation (EGR) cooler for cooling EGR gas flowing into the engine through a low temperature coolant line, a low temperature coolant pump provided on the low temperature coolant line, a water-cooled intercooler connected to the low temperature coolant line and the high temperature coolant line, an intake air temperature sensor for measuring a temperature of an intake air flowing into the engine and outputting a corresponding signal, bypass valves provided upstream and downstream of the water-cooled intercooler for selectively controlling the high temperature coolant or the low temperature coolant to flow through the water-cooled intercooler, an ambient temperature sensor for measuring a temperature of an outdoor temperature and outputting a corresponding signal, a radiator bypass line connected to the high temperature coolant line and bypassing the high temperature radiator, a thermostat configured for the high temperature coolant to selectively flow to the radiator bypass line bypassing the high temperature radiator, and a controller for controlling the operations of the low temperature coolant pump, the bypass valves and the thermostat in accordance with a vehicle operation state signals received from a vehicle operation state detecting portion which includes the coolant temperature sensor, the intake air temperature sensor and the ambient temperature sensor.

The thermostat may be an electric thermostat.

The low temperature coolant pump may be an electric pump.

The engine may include a block water jacket for cooling an engine block and a head water jacket for cooling a cylinder head, and the high temperature coolant discharged from the high temperature coolant pump may flow from the block water jacket to the head water jacket.

The head water jacket may include a lower water jacket cooling a lower part of the cylinder head and an upper water jacket cooling an upper part of the cylinder head.

A control method according to an exemplary form of the present disclosure may be applied to the coolant control system.

The control method for the coolant control system may include: receiving, by the controller, the vehicle operation state signals, and determining, by the controller, whether vehicle operation state satisfies a predetermined cold driving condition; controlling, by the controller, the operation of the low temperature coolant pump so as to stop the low temperature coolant flow; controlling, by the controller, the operation of the thermostat so that the high temperature coolant does not flow to the high temperature radiator; and controlling, by the controller, the operation of the bypass valves in accordance with an output signal of the intake air temperature sensor when the vehicle operation state satisfies the predetermined cold driving condition.

The control method may further include: determining, by the controller, whether the vehicle operation state satisfies a predetermined first ambient temperature condition; controlling, by the controller, the operation of the bypass valves so that the low temperature coolant flows to the water-cooled intercooler; and controlling, by the controller, the low temperature coolant pump to operate when the vehicle operation state satisfies the predetermined first ambient temperature condition.

The control method may further include controlling, by the controller, the operation of the thermostat according to the output signal of the coolant temperature sensor.

The control method may further include: determining, by the controller, whether the vehicle operation state satisfies a predetermined second ambient temperature condition; controlling, by the controller, the operation of the bypass valves so that the low temperature coolant flows to the water-cooled intercooler; and controlling, by the controller, the operation of the low temperature coolant pump in accordance with the output signal of the intake air temperature sensor when the vehicle operation state satisfies the predetermined second ambient temperature condition.

The control method may further include controlling, by the controller, the operation of the thermostat according to the output signal of the coolant temperature sensor.

The control method may further include: determining, by the controller, whether the vehicle operation state satisfies a predetermined third ambient temperature condition; controlling, by the controller, the operation of the bypass valve so that the high temperature coolant flows to the water-cooled intercooler; and controlling, by the controller, the operation of the low temperature coolant pump according to the output signal of the intake air temperature sensor when the vehicle operation state satisfies the predetermined third ambient temperature condition.

The control method may further include controlling, by the controller, the operation of the thermostat according to the output signal of the coolant temperature sensor.

According to the coolant control system in the forms of the present disclosure, the high temperature radiator and the low temperature radiator are applied to improve the cooling efficiency in various external environments.

According to the coolant control system according to the form of the present disclosure, the coolant in the high temperature radiator and the low temperature radiator selectively flows into the intercooler, thereby reducing the influence of the intake air temperature due to the ambient temperature.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
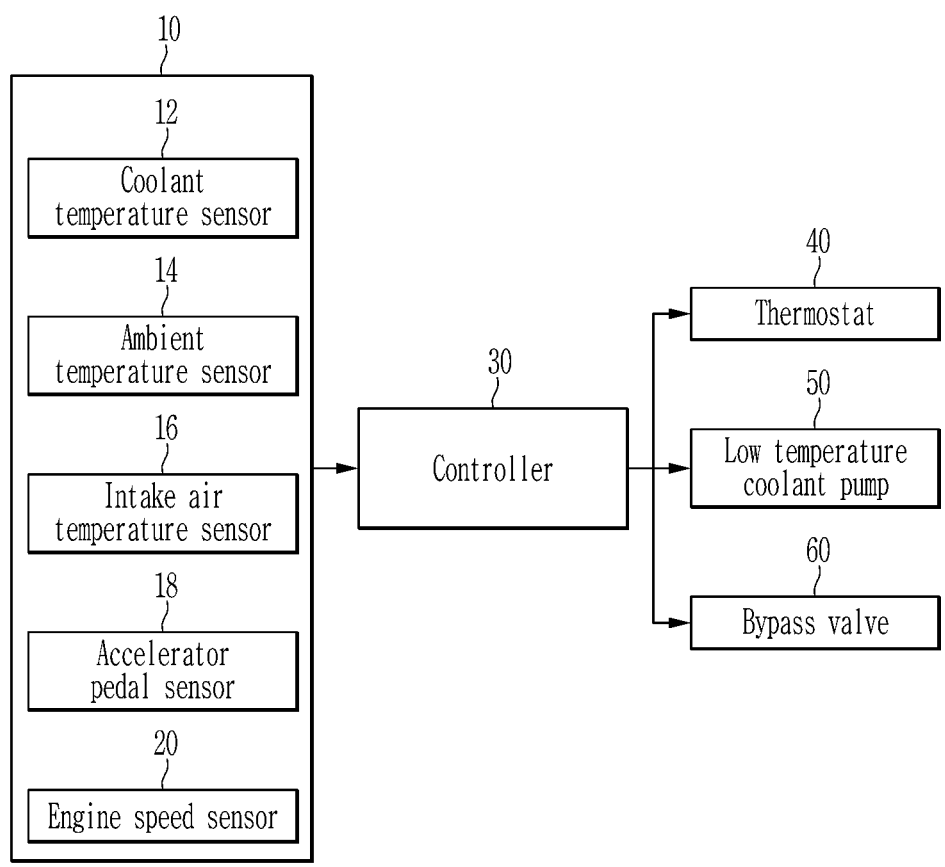
FIG. 1 is a block diagram of a coolant control system according to an exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the following detailed description, only certain exemplary forms of the present disclosure have been shown and described, simply by way of illustration.

As those skilled in the art would realize, the described forms may be modified in various different ways, all without departing from the spirit or scope of the present disclosure In addition, parts that are irrelevant to the description are omitted to clearly describe the exemplary forms of the present disclosure, and like reference numerals designate like elements throughout the specification.

In the specification, unless explicitly described to the contrary, the word "comprise" and variations such as "comprises" or "comprising", will be understood to imply the inclusion of stated elements but not the exclusion of any other elements.

An exemplary form of the present disclosure will hereinafter be described in detail with reference to the accompanying drawings.

Figure 2:
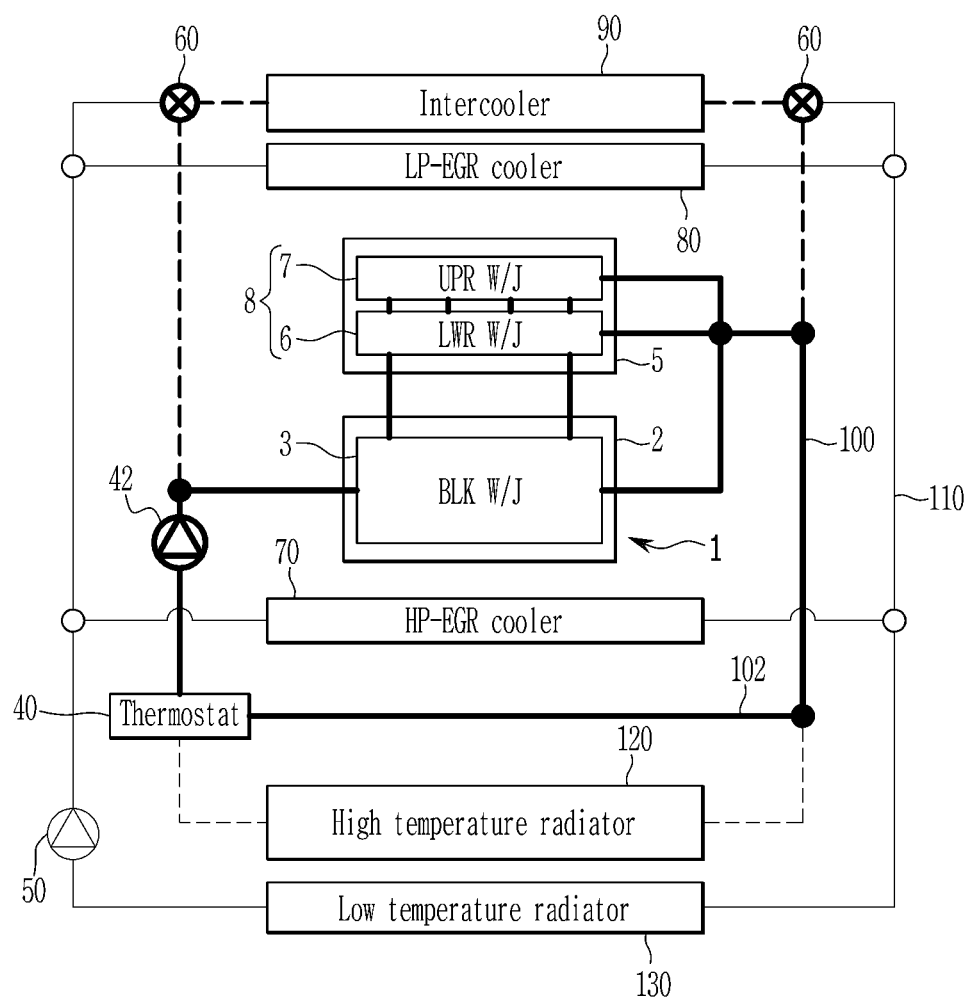
FIG. 2 to FIG. 5 are schematic diagrams of a coolant control system according to an exemplary form of the present disclosure.

FIG. 1 is a block diagram of a coolant control system according to an exemplary form of the present disclosure and FIG. 2 is a schematic diagram of a coolant control system according to an exemplary form of the present disclosure.

Referring to FIG. 1 and FIG. 2, a coolant control system includes: a high temperature radiator 120 communicating with an engine 1 through a high temperature coolant line 100, a high temperature coolant pump 42 provided on the high temperature coolant line 100, a coolant temperature sensor 12 detecting a temperature of a high temperature coolant flowing through the engine 1 and the high temperature radiator 120 and outputting a corresponding signal, a low temperature radiator 130 communicating with an exhaust gas recirculation (EGR) cooler for cooling EGR gas flowing into the engine 1 through a low temperature coolant line 110, a low temperature coolant pump 50 provided on the low temperature coolant line 110, a water-cooled intercooler 90 connected to the low temperature coolant line 110 and the high temperature coolant line 100, an intake air temperature sensor 16 for measuring a temperature of an intake air flowing into the engine 1 and outputting a corresponding signal, bypass valves 60 provided upstream and downstream of the water-cooled intercooler 90 for selectively controlling the high temperature coolant or the low temperature coolant to flow through the water-cooled intercooler 90, an ambient temperature sensor 14 for measuring a temperature of an outdoor temperature and outputting a corresponding signal, a radiator bypass line 102 connected to the high temperature coolant line 100 and bypassing the high temperature radiator 120, a thermostat 40 configured to selectively flow the high temperature coolant to the radiator bypass line 102 bypassing the high temperature radiator 120, and a controller 30 for controlling the operations of the low temperature coolant pump 50, the bypass valve 60 and the thermostat 40 in accordance with a vehicle operation state signal of a vehicle operation state detecting portion 10 including the coolant temperature sensor 12, the intake air temperature sensor 16 and the ambient temperature sensor 14.

The vehicle operation state detecting portion 10 includes the coolant temperature sensor 12, the intake air temperature sensor 16 and the ambient temperature sensor 14 and may further include accelerator pedal sensor 18 detecting an operation angle of an accelerator pedal and outputting a corresponding signal and an engine speed sensor 20 detecting engine speed and outputting a corresponding signal. And the vehicle operation state detecting portion 10 may be various sensors.

The controller 30 may be embodied as one or more microprocessors that operate according to a set program, and the set program may include a series of instructions for performing a method according to an exemplary form of the present disclosure to be described later.

The EGR cooler may include an HP-EGR (high-pressure EGR) cooler 70 and an LP-EGR (low-pressure EGR) cooler 80.

The intake air temperature sensor 16, for example, may be mounted on an intake manifold to measure the intake temperature inflow into the combustion chamber of the engine 1 and output the corresponding signal.

The intake air temperature sensor 16 may detect temperature of gas cooled by the water-cooled intercooler 90 as a mixture of exhaust passing through the EGR cooler and fresh air.

The thermostat 40 may be an electric thermostat and the low temperature coolant pump 50 may be an electric pump. Therefore, the controller 30 may control the operations of the thermostat 40 and the low temperature coolant pump 50.

When the thermostat 40 is operated, the coolant flows to the high temperature radiator 120, and if the thermostat 40 does not operate, the coolant flows through the radiator bypass line 102.

The engine 1 includes a block water jacket 3 formed to cool an engine block 2, and a head water jacket 8 formed to cool a cylinder head 5, and the high temperature coolant exhausted from the high temperature coolant pump 42 flows from the block water jacket 3 to the head water jacket 8.

The head water jacket 8 may include a lower water jacket 6 that cools a lower part of the head 5 and an upper water jacket 7 that cools an upper part of the head 5. The head water jacket 8 is divided into the lower water jacket 6 and the upper water jacket 7 to allow the local temperature control of the head 5.

Figure 4:
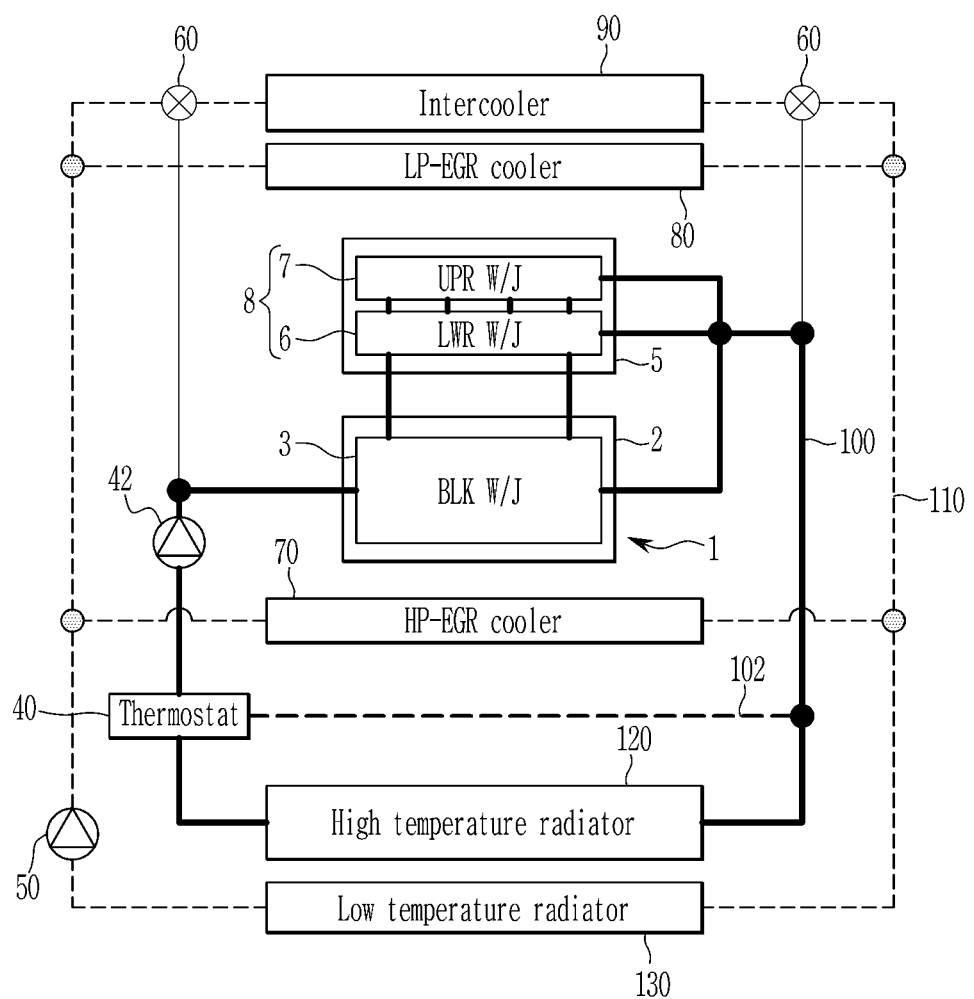
Figure 5:
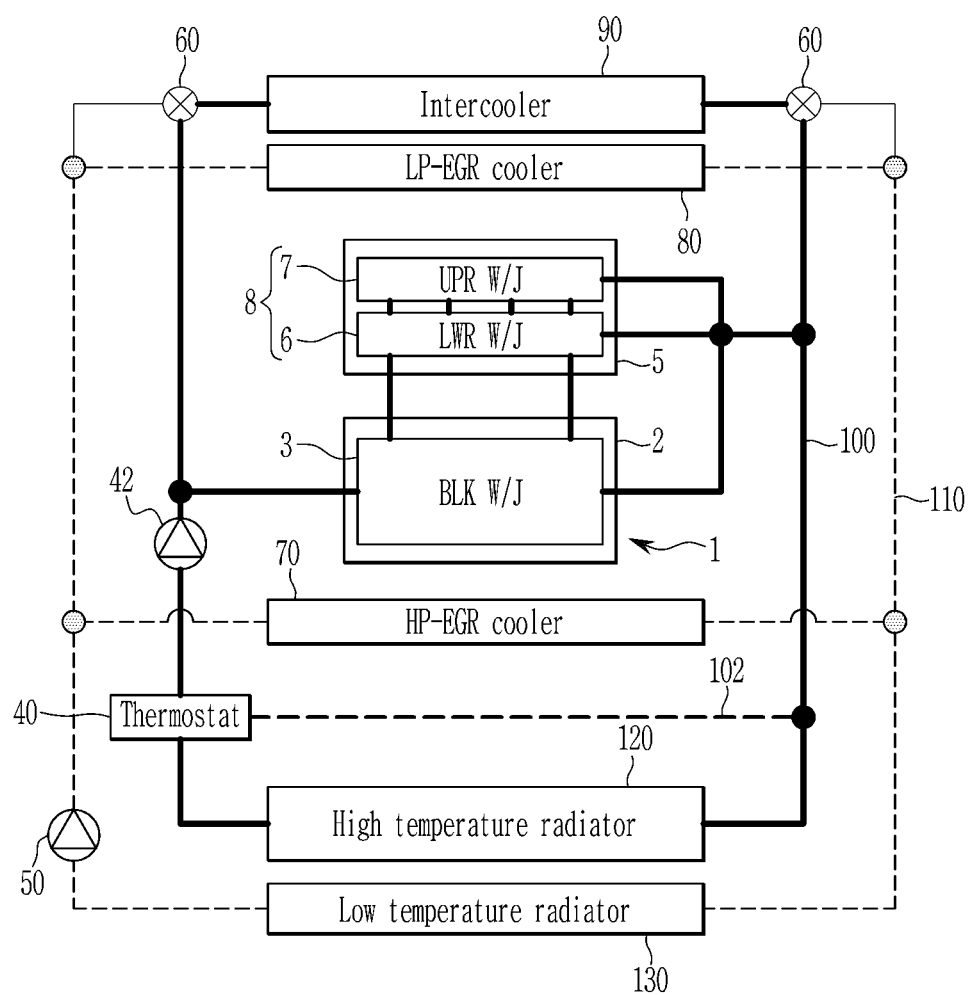
Figure 6:
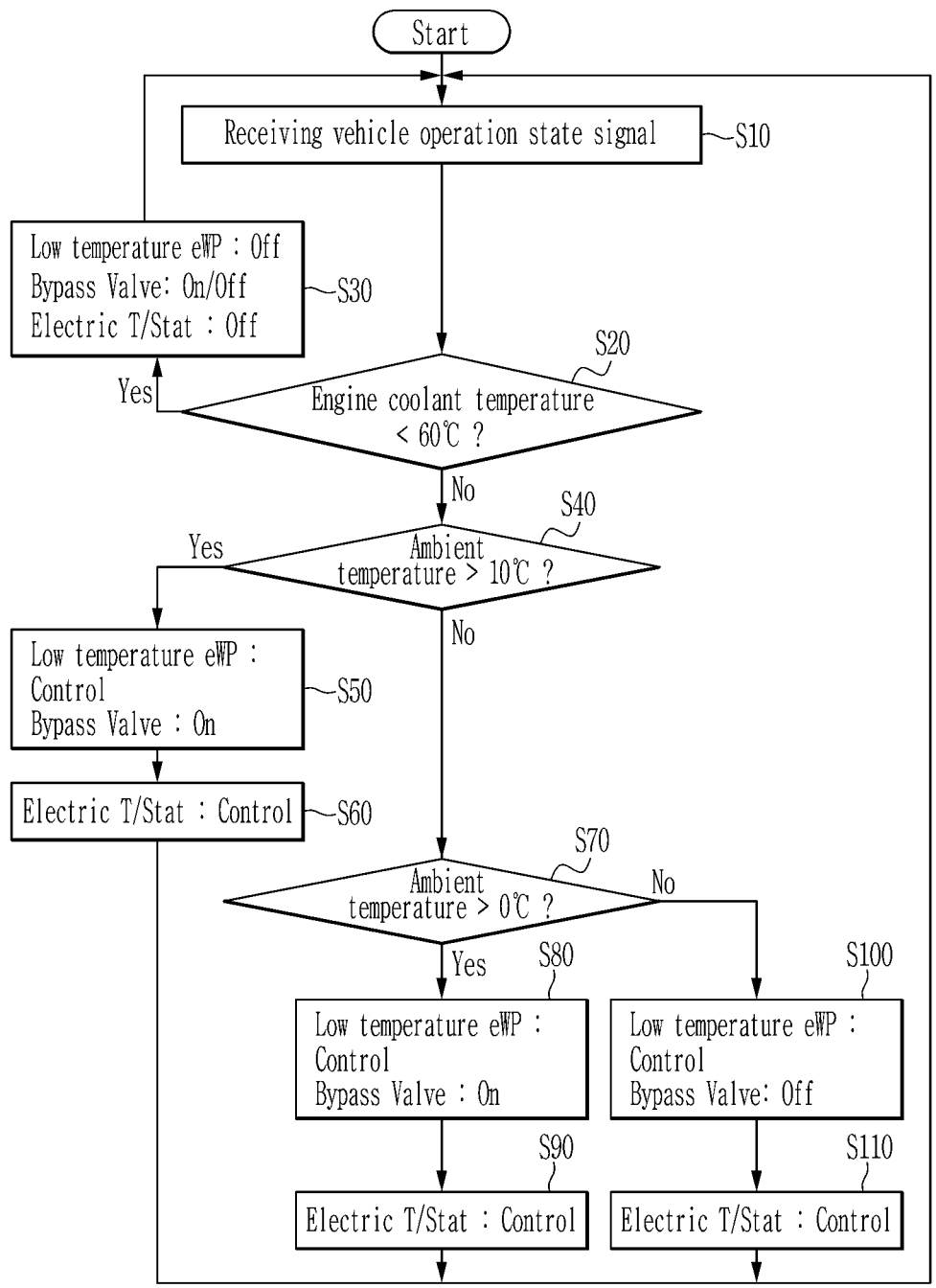
FIG. 6 is a flowchart of a coolant control method according to an exemplary form of the present disclosure.

FIG. 2 to FIG. 5 are schematic diagrams of a coolant control system according to an exemplary form of the present disclosure, and FIG. 6 is a flowchart of a coolant control method according to an exemplary form of the present disclosure.

Hereinafter, a coolant control method according to an exemplary form of the present disclosure will be described with reference to FIGS. 1 to 6. FIG.

The coolant control method according to the exemplary form of the present disclosure may be applied to the coolant control system described above.

At a step S10, the controller 30 receives the vehicle operation state signal by the controller 30 and at a step S20, and the controller 30 determines whether the output signal of the water temperature sensor 12 satisfies a predetermined cold driving condition. If the output signal of the water temperature sensor 12 satisfies the predetermined cold driving condition, the controller 30 controls the operation of the low temperature coolant pump 50 so that the low temperature coolant flow is stopped, controls the operation of the thermostat 40 so that the high temperature coolant does not flow to the high temperature radiator 120, and controls the operation of the bypass valve 60 in accordance with an output signal of the intake air temperature sensor 16 at a step S30.

As shown in FIG. 2, the predetermined cold driving condition is a state in which the coolant temperature is, for example, 60 degrees or less, such as the start timing, the thermostat 40 is turned off and coolant does not flow into the high temperature radiator 120, so that warm up time of an engine may be shortened.

In addition, since the low temperature coolant pump 50 is not operated, an activation temperature reaching time of a post-treatment system may be shortened.

The operation of the bypass valve 60 is controlled in accordance with the output signal of the intake air temperature sensor 16 so that the coolant flowing through the high temperature coolant line 100 selectively flows into the water-cooled intercooler 90 and flows into the combustion chamber and the intake air temperature may be kept constant.

The target temperature of the coolant flowing through the high temperature radiator 120 may be set to about 90 degrees or more. In this case, the vehicle operation state detecting portion 10 may further include the accelerator pedal sensor 18 and the engine speed sensor 20, and the target temperature of the coolant may various according to the signals of the vehicle operation state detecting portion 10.

And, the coolant temperature flowing through the low temperature radiator 130 may be set to a target temperature of about 40 to 60 degrees.

Figure 3:
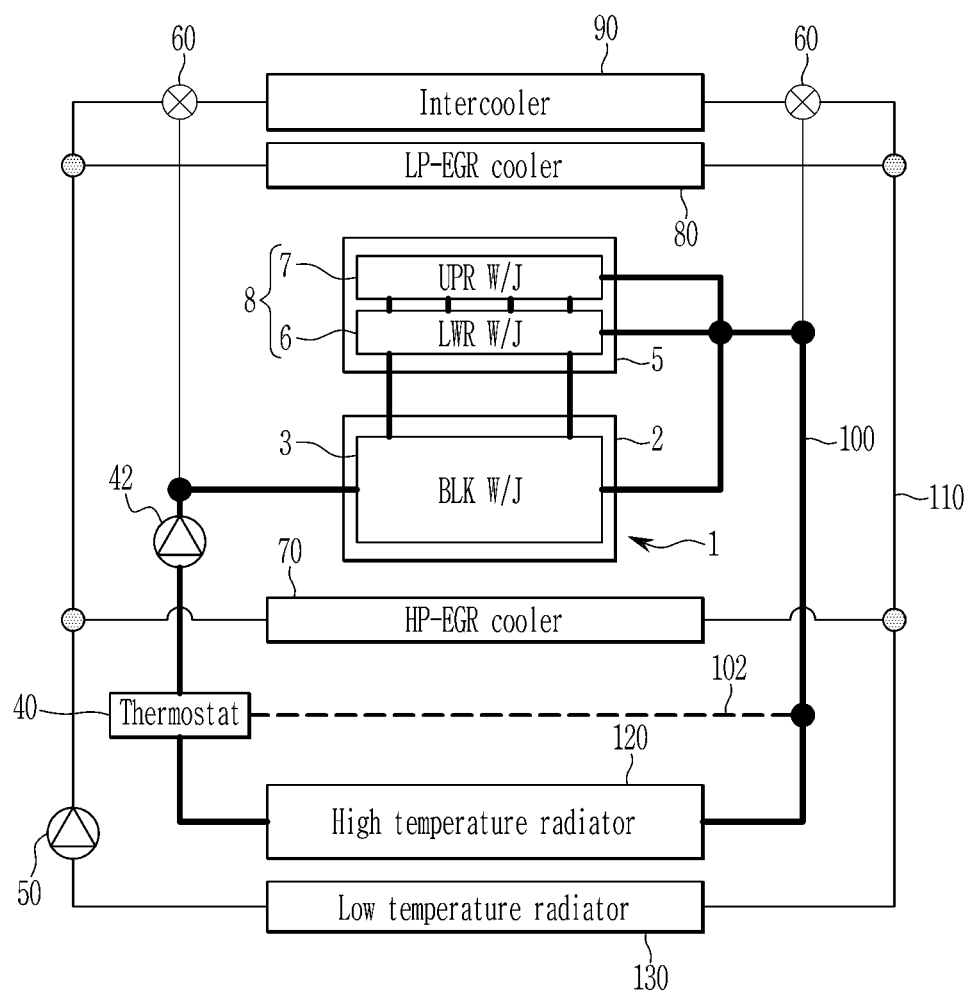

Referring FIG. 3 and FIG. 6, an exemplary form of the present disclosure, the controller 30 determines whether the output signal of the ambient temperature sensor 14 satisfies to a predetermined first ambient temperature condition at a step S40 and if the output signal of the ambient temperature sensor 14 corresponds to a predetermined first ambient temperature condition, the controller 30 controls the operation of the bypass valve 60 so that the low temperature coolant flows to the water-cooled intercooler 90 and the low temperature coolant pump 50 operates at a step S50.

In this case, the coolant temperature is warmer than the set temperature, for example 60 degrees, and the ambient temperature is higher than the predetermined first ambient temperature condition, for example 10 degrees. The low temperature coolant pump 50 and the bypass valve 60 operate and the low temperature coolant flows to the water-cooled intercooler 90, the HP-EGR cooler 70 and the LP-EGR cooler 80.

Thus, the low temperature coolant cools the water-cooled intercooler 90 so that fuel consumption may be enhanced and further cooling of the HP-EGR cooler 70 and LP-EGR cooler 80 with the low temperature coolant may reduce EM and NOx.

The exemplary form of the present disclosure further includes a step S60 in which the controller 30 controls the operation of the thermostat 40 according to the output signal of the coolant temperature sensor 12. Therefore, the selective operation of the thermostat 40 may control the coolant temperature flowing through the engine 1 and protect the engine.

FIG. 4 and referring to FIG. 6, the controller 30 determines whether the output signal of the ambient temperature sensor 14 corresponds to a predetermined second ambient temperature condition at a step S70 and the controller 30 controls the operation of the bypass valve 60 so that the low temperature coolant flows to the water-cooled intercooler 90 and controls the operation of the low temperature coolant pump 50 according to the output signal of the intake air temperature sensor 16 at a step S80 if the ambient temperature sensor 14 is determined to satisfy the predetermined second ambient temperature condition.

The second ambient temperature condition is such that the low temperature coolant flows selectively to the water-cooled intercooler 90, the HP-EGR cooler 70, and the LP-EGR cooler 80, for example, less than 10 degrees and greater than 0 degrees. The water-cooled intercooler 90, the HP-EGR cooler 70 and LP-EGR cooler 80 are selectively cooled according to the output signal of the ambient temperature sensor 14 because the second ambient temperature condition is lower than the first ambient temperature condition. Therefore, it is possible to reduce or minimize the influence of the intake air temperature and/or the EGR gas temperature on the ambient temperature.

An exemplary form of the coolant control method further includes a step S90 in which the controller 30 controls the operation of the thermostat 40 according to the output signal of the coolant temperature sensor 12. Therefore, the selective operation of the thermostat 40 may control the coolant temperature flowing through the engine 1 and protect the engine.

Referring to FIG. 5 and FIG. 6, the controller 30 determines whether the output signal of the ambient temperature sensor 14 corresponds to a third ambient temperature condition at a step S70, and controller 30 controls the operation of the bypass valve 60 so that the high temperature coolant flows to the water-cooled intercooler 90 and controls the operation of the low temperature coolant pump 50 according to the output signal of the intake air temperature sensor 16 if the ambient temperature sensor 14 is determined to correspond to the predetermined third ambient temperature condition at a step S100.

In the third ambient temperature condition, for example, intake temperature of air inflow to the engine is less than 0 degrees, so that it is needed to increase the intake temperature of the air inflow to the engine. Thus, the bypass valve 60 is turned off, allowing the high temperature coolant to flow to the water-cooled intercooler 90, maintaining the intake temperature at an appropriate temperature for combusting.

The low temperature coolant pump 50 operates according to the output signal of the intake air temperature sensor 16 to cool the HP-EGR cooler 70 and the LP-EGR cooler 80, so that the intake temperature inflow to the combustion chamber may be appropriately maintained, and it is possible to reduce or minimize the effect of intake air temperature and/or EGR gas temperature.

The control method further includes a step S110 in which the controller 30 controls the operation of the thermostat 40 according to the output signal of the coolant temperature sensor 12. Therefore, the selective operation of the thermostat 40 may control the coolant temperature flowing through the engine 1 and protect the engine.

According to an exemplary form of the present disclosure, the coolant control system and the control method enable fast warm-up in the early stages of starting and shortening the activation temperature reaching time of the post-treatment system. Also, enhancement of fuel consumption and EM and NOx reduction are possible in normal warm conditions.

In addition, depending on the ambient temperature, it is possible to select the coolant passing through the intercooler to maintain an appropriate temperature of the intake air flowing into the engine.

While this present disclosure has been described in connection with what is presently considered to be practical exemplary forms, it is to be understood that the present disclosure is not limited to the disclosed forms. On the contrary, it is intended to cover various modifications and equivalent arrangements included within the spirit and scope of the appended claims.

| <Description of symbols> | |
| --- | --- |
| 1: engine | 2: block |
| 3: block water jacket | 5: head |
| 6: lower water jacket | 7: upper water jacket |
| 8: head water jacket | 3: intake manifold |
| 5: exhaust manifold | |
| 10: vehicle operation state detecting portion | |
| 12: coolant temperature sensor | 14: ambient temperature sensor |
| 16: intake air temperature sensor | 18: accelerator pedal sensor |
| 20: engine speed sensor | 30: controller |
| 40: thermostat | 42: high temperature coolant pump |

| <Description of symbols> | |
| --- | --- |
| 50: low temperature coolant pump | 60: bypass valve |
| 70: HP-EGR cooler | 80: LP-EGR cooler |
| 90: intercooler | 100: high temperature coolant line |
| 102: radiator bypass line | 110: low temperature coolant line |
| 120: high temperature radiator | |

What is claimed is:

1. A control method for controlling a coolant control system, where the coolant control system comprises:
  a high temperature radiator configured to communicate with an engine through a high temperature coolant line;
  a high temperature coolant pump provided on the high temperature coolant line;
  a coolant temperature sensor configured to detect a temperature of a high temperature coolant flowing through the engine and the high temperature radiator, and configured to output a corresponding signal;
  a low temperature radiator configured to communicate with an exhaust gas recirculation (EGR) cooler for cooling EGR gas flowing into the engine through a low temperature coolant line;
  a low temperature coolant pump provided on the low temperature coolant line;
  a water-cooled intercooler connected to the low temperature coolant line and the high temperature coolant line;
  an intake air temperature sensor configured to measure a temperature of an intake air flowing into the engine and configured to output a corresponding signal;
  bypass valves provided upstream and downstream of the water-cooled intercooler and configured to selectively control the high temperature coolant or a low temperature coolant to flow through the water-cooled intercooler;
  an ambient temperature sensor configured to measure a temperature of an outdoor temperature and configured to output a corresponding signal;
  a radiator bypass line connected to the high temperature coolant line and configured to bypass the high temperature radiator;
  a thermostat configured for the high temperature coolant to selectively flow to the radiator bypass line bypassing the high temperature radiator; and
  a controller configured to control operations of the low temperature coolant pump, the bypass valves and the thermostat based on vehicle operation state received from the coolant temperature sensor, the intake air temperature sensor and the ambient temperature sensor,
  the control method comprising:
  receiving, by the controller, the vehicle operation state;
  determining, by the controller, whether the vehicle operation state meets a predetermined cold driving condition;
  controlling, by the controller, the low temperature coolant pump so as to stop the low temperature coolant flow, and controlling the thermostat so that the high temperature coolant does not flow to the high temperature radiator; and
  controlling, by the controller, the bypass valves based on an output signal of the intake air temperature sensor when the vehicle operation state meets the predetermined cold driving condition.

2. The control method of claim 1, further comprising:
determining, by the controller, whether the vehicle operation state meets a predetermined first ambient temperature condition;
controlling, by the controller, the bypass valves so that the low temperature coolant flows to the water-cooled intercooler; and
controlling, by the controller, the low temperature coolant pump to operate when the vehicle operation state meets the predetermined first ambient temperature condition.

3. The control method of claim 2, further comprising: controlling, by the controller, the thermostat based on the output signal of the coolant temperature sensor.

4. The control method of claim 1, further comprising:
determining, by the controller, whether the vehicle operation state meets a predetermined second ambient temperature condition;
controlling, by the controller, the bypass valves so that the low temperature coolant flows to the water-cooled intercooler; and
controlling, by the controller, the low temperature coolant pump based on the output signal of the intake air temperature sensor when the vehicle operation state meets the predetermined second ambient temperature condition.

5. The control method of claim 4, further comprising: controlling, by the controller, the thermostat based on the output signal of the coolant temperature sensor.

6. The control method of claim 1, further comprising:
determining, by the controller, whether the vehicle operation state meets a predetermined third ambient temperature condition;
controlling, by the controller, the bypass valves so that the high temperature coolant flows to the water-cooled intercooler, and
controlling, by the controller, the low temperature coolant pump based on the output signal of the intake air temperature sensor when the vehicle operation state meets the predetermined third ambient temperature condition.

7. The control method of claim 1, further comprising: controlling, by the controller, the thermostat based on the output signal of the coolant temperature sensor.

* * * * *